No. 892,513. PATENTED JULY 7, 1908.
E. A. FORSBERG.
CENTRIFUGAL SEPARATOR.
APPLICATION FILED SEPT. 22, 1905.

WITNESSES:—
M. M. Hamilton
E. E. Wall

INVENTOR
Erik A. Forsberg
BY
Harding & Harding
ATTORNEYS.

UNITED STATES PATENT OFFICE.

ERIK AUGUST FORSBERG, OF STOCKHOLM, SWEDEN, ASSIGNOR TO AKTIEBOLAGET SEPARATOR, OF STOCKHOLM, SWEDEN.

CENTRIFUGAL SEPARATOR.

No. 892,513.  Specification of Letters Patent.  Patented July 7, 1908.

Application filed September 22, 1905. Serial No. 279,618.

*To all whom it may concern:*

Be it known that I, ERIK AUGUST FORSBERG, a subject of the King of Sweden, residing at Stockholm, Sweden, have invented a new and useful Improvement in Centrifugal Separators, of which the following is a full, clear, and exact description, reference being had to the accompanying drawings, which form a part of this specification.

The object of the invention is to provide a self balancing bowl of large skimming capacity.

The advantage of a self balancing bowl is that it maintains a steady motion even if the center of gravity and the principal axis of inertia diverge in a high degree from the axis of rotation. In order, however, to avoid irregularities in rotation or strong vibrations arising in self-balancing bowls, driven in accordance with known systems, when the bowl begins or ceases to run, it is necessary that the rotating masses be distributed in such a manner that the moment of inertia with regard to the axis of rotation is greater than the moment of inertia with regard to an axis through the center of gravity and perpendicular to said axis, and this necessitates that the bowl should have a large breadth and a small height. With a bowl of such shape, however, the difficulty arises of providing liners that give good results as regards skimming capacity. The ordinary liner consisting of superposed conical plates is not practicable, as the plates, on account of the shape of the bowl, must be nearly flat and consequently of low skimming capacity. Therefore attempts have been made to use, in such self-balancing bowls, liners of other constructions that are better adapted to the shape of the bowl, but without success so far as concerns the achievement of good results as to skimming capacity.

My invention consists in the arrangement, in such a self-balancing bowl, of vertical plates, twisted like an involute scroll, inserted in and loose with respect to the bowl and closely adjacent to each other. Plates of this shape, when put together in a cylindrical bowl, have the same space left between them over their whole surface (contrarily to plates curved on a circle) so that the inner space of the bowl will be well utilized. In other words, the skimming surface in a given space of the bowl is greater when plates of the said shape are used.

Figure 1:
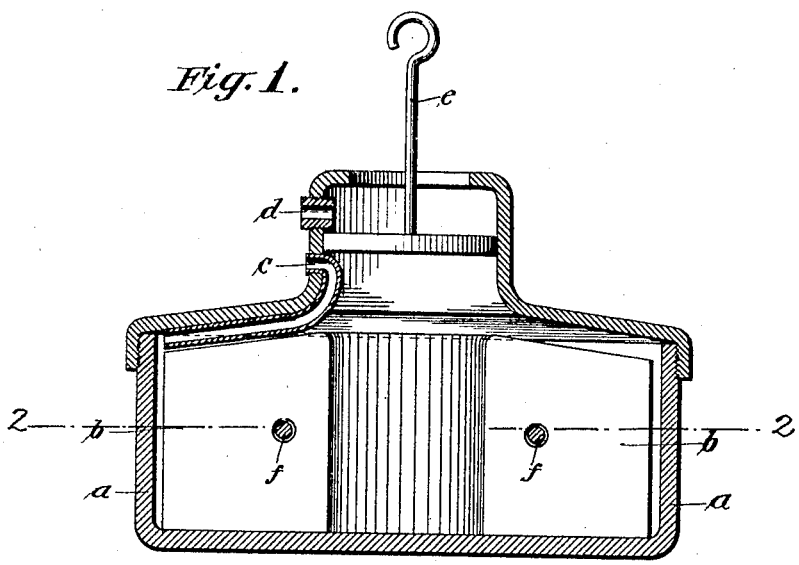
Figure 2:
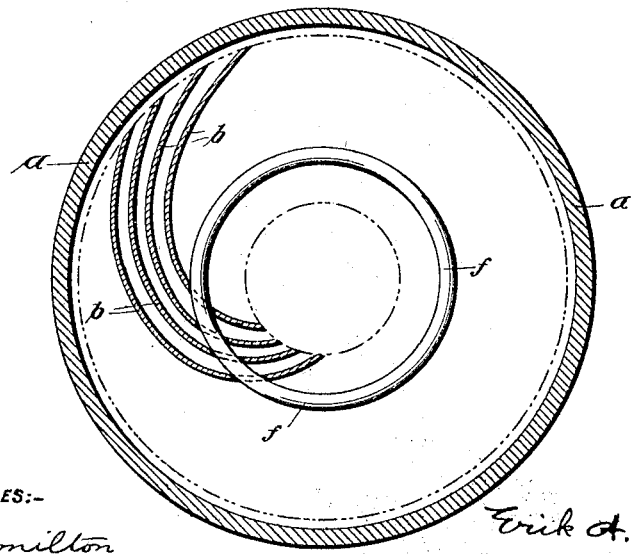

In the drawings: Figure 1 is a vertical section and Fig. 2 is a horizontal section, on the line 2—2 of Fig. 1, through the bowl.

*a* is the bowl, *b, b* etc. the plates of involute shape within the bowl, *c* the skim milk discharge tube, *d* the cream discharge orifice, *e* a hooked rod secured within the bowl neck and constituting a suspension device by means of which the bowl is supported above its center of gravity, and *f* a ring by means of which the plates are connected together. The ring may, if desired, be omitted.

By means of the combination with a self-balancing relatively shallow bowl of a liner of involute shaped disks, a new technical effect is gained, which has not hitherto been reached with other combinations of bowls and liners, as by this combination it is possible to combine the advantages of the self-balancing system with disks of a large skimming capacity. It is unnecessary to put the plates into the bowl in any given order.

I am aware that it has heretofore been proposed to use vertical plates of involute shape in centrifugal machines of the non-automatically balancing type, but their use, in such bowls, is not practicable, inasmuch as the plates yielding to the influence of the centrifugal force, are easily displaced and sometimes compressed out of shape, whereby the bowl will lose its balance. On the other hand, in a self-balancing bowl this drawback would be of no importance.

Having now fully described my invention, what I claim and desire to protect by Letters Patent is:—

1. In an automatically self-balancing centrifugal separator, the combination with the bowl, of vertical plates of involute shape inserted in, and loose with respect to, the bowl and closely adjacent to each other.

2. In a centrifugal separator, the combination with a self-balancing separator bowl in which the diameter of the bowl is essentially greater than its height, of vertical plates of involute shape inserted in, and loose with respect to, the bowl and closely adjacent to each other.

3. In a centrifugal separator of such shape that the moment of inertia with regard to the axis of rotation is greater than the moment of inertia with regard to an axis through the center of gravity of the bowl and perpendicular to said axis of rotation, the combination with the bowl, of vertical plates of involute shape inserted in, and loose with respect to, the bowl and closely adjacent to each other.

4. In a centrifugal separator, the combination with a self balancing separator bowl in which the diameter of the bowl is essentially greater than its height, of vertical plates of involute shape inserted in and loose with respect to the bowl, and a ring loosely engaging all of said plates and keeping them together, said plates being otherwise disconnected.

In testimony of which invention, I have hereunto set my hand, at Stockholm, Sweden, on this 6th day of September, 1905.

ERIK AUGUST FORSBERG.

Witnesses:
 CARL FRIBERG,
 HARRY FR. ALBIHN.